United States Patent Office 3,412,119
Patented Nov. 19, 1968

3,412,119
SUBSTITUTED STANNOLES, PHOSPHOLES, ARSOLES, AND STIBOLES
Frederick C. Leavitt, Midland, Mich., and Francis Johnson, Newton Lower Falls, Mass., assignors to The Dow Chemical Company, Midland, Mich., a corporation of Delaware
No Drawing. Continuation-in-part of application Ser. No. 811,513, May 7, 1959. This application July 22, 1963, Ser. No. 296,481
11 Claims. (Cl. 260—429.7)

This invention relates to certain organo metallic compounds identified as heterocyclic compounds in which the metal is incorporated into a ring, which is characterized by the presence of a conjugated double bond system.

This application is a continuation-in-part of our application, Ser. No. 811,513, filed May 7, 1959, which has issued as U.S. Patent 3,116,307, dated Dec. 31, 1963.

Cyclic organic compounds of metals or metalloids of a variety of structures are known, but, in general, they are characterized by their being saturated ring compounds or their merely having one double bond. The few previously known organo metallic (or metalloid) systems which contain the hetero atom as part of a conjugated system are known to exhibit unique properties with regard to thermal stability and chemical reactivity. Incorporation of elements other than those known to exist in such systems would be desirable for a variety of purposes, which include polymerization reactions in which it is desired to have a particular metal enter into the reaction or even function as a catalyst in the polymerization reaction. It may be desirable to introduce a metal into a reaction medium as an organo metallic compound accompanied by a conjugated double bond system. Also, for many purposes, for example, fluid catalyst activity in the petroleum industry, the presence of a metal in the form of a compound which would be soluble in the petroleum medium would be highly advantageous in providing reaction sites and catalysts for reaction.

It is, accordingly, a fundamental object of this invention to provide a process for preparing organic compounds of metals and metalloids, wherein the metal or metalloid will have at least two of its valences satisfied by incorporation into a radical or combination or organic radicals forming part of a conjugated system.

It is a further object of the invention to provide a sequence of new compounds characterized by the incorporation of a metal or metalloid atom into an organic moiety which may be cyclic and includes a conjugated double bond system and renders the metal available in this form for use in reactions.

Other objects and advantages of the invention will in part be obvious and in part appear hereinafter.

The invention, accordingly, is concerned with new compounds which may be characterized as metal or metalloid compounds in organic form with a conjugated system of double bonds in the organic radical portion of the compound, the radical itself being non-aromatic and attached to the metal or metalloid and may make the compound itself heterocyclic, the metal or metalloid being an element other than carbon, sulphur, selenium, tellurium, oxygen or nitrogen, and more specifically, may include phosphorus, tin, mercury, magnesium, silicon, arsenic, bismuth, germanium, and antimony. A limitation upon the formation of the organo compound is the availability of the particular element as such, or in the form of a di- or polyhalide, di-or polyalkoxy compound or similar reactive compounds suitable for reaction to prepare the desired metallic derivative. The second aspect of the invention is in the process of manufacture which may be characterized by the method of reacting the dihalogen or dialkoxy compound of the element with a dilithium butadiene compound, or like compound having a conjugate double bond system. The reaction between the dihalogen compound of the element with the dilithium compound involves a direct replacement which may include ring closure as follows:

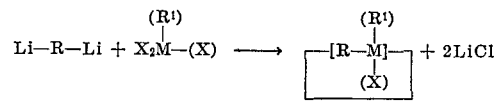

More specifically stated, the new compounds which correspond to this invention may be described by the following representations:

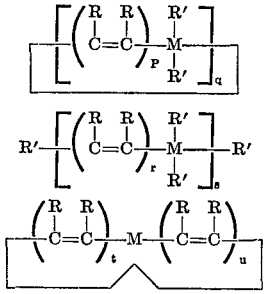

wherein R and R' may be the same and are selected from the group of common organic moieties consisting of hydrogen, vinyl, aryl, phenyl alkyl, halogen, alkoxy, carboxyl, nitrile, etc. M is any element having a valence greater than 1 other than carbon, sulphur, selenium, tellurium, oxygen and nitrogen. P, $q$, $r$, $s$, $t$, $u$ are integers having finite values so related that when $r$ is 1, $s$ is at least 2 and when $r$ is 2, $s$ is at least 1.

The result of the reaction is that the product may be the corresponding heterocyclic compound of the element or a polymer.

In general, reaction between the two materials is substantially instantaneous and there appears to be no problem involved in causing the reaction to occur. However, there is the normal problem of controlling the rate of reaction and, accordingly, the use of a solven to moderate conditions is generally indicated. The compounds, namely, di or polyhalide compounds in general, are soluble in chlorinated hydrocarbons and such materials as ethyl ether, propyl ether or heavier ethers and similar high boiling hydrocarbons. The further condition of the reaction is that it must be conducted under anhydrous conditions and the solvent utilized must be inert to reaction with lithium. It is also desirable to conduct the reaction in the absence of oxygen and carbon dioxide and, accordingly, it is best carried out in an inert atmosphere such as nitrogen, or hydrocarbon vapor.

Inasmuch as the system is highly reactive and reaction is essentially spontaneous, pressure and temperature under which the reaction is to be conducted have no real meaning. Essentially, the only problem involved, therefore, is to conduct the reaction under reasonably moderate conditions of temperature, accompanied by dilution of reactants in a substantial volume of solvent, for example, and to recover the product in a reasonable yield. As a matter of actual practice, the reaction need not be conducted in solution. That is, the dihalogen compound of the element can be dispersed in a solvent or carrier in which it is not soluble and, likewise, the dilithium butadiene compound can be dispersed in a solvent in which it is not soluble. Contact of the reactant materials in such a medium, even with two immiscible solvents, is sufficient because, reactivity of the materials is such that reaction will occur and the intensity of the reaction will be somewhat moderated under such conditions.

Typical syntheses carried out in accordance with the invention are the following, wherein the precise conditions may be taken as adequately suited for carrying out the reaction with the particular metal or metalloid mentioned. However, it is to be understood that the conditions, solvents, temperatures, and the like, are merely illustrative and are consistent with the general definitions given.

Example I.—2.07 grams diphenylactylene and 0.0804 grams of lithium shot were added to 20 millilitres diethyl ether (anhydrous) in a 50 milliliter round bottom, one-necked flask. The flask was stoppered and shaken 16 hours at room temperature. A 250 milliliter Erlenmeyer flash equipped with a magnetic stirring bar was charged with 125 milliliters anhydrous ether and cooled at 0° C. Dry nitrogen was injected continuously through a rubber closure. Dichloro phenyl phosphine (1.32 grams) was added by a syringe with stirring. The contents of the initial flask were removed by a syringe (filtered through a plug of glass wool) and added slowly with stirring to the phosphine contained in the flask. An immediate reaction took place yielding a light yellow solid. Upon completion of the addition the solid was filtered, washed and recrystallized from benzene-ethanol.

This yielded a yellow crystal, M.P. 259–261° C.

$$\phi-C\equiv\phi + Li \rightarrow \underset{\phi\ \phi\ \phi\ \phi}{Li-C=C-C=C Li} \quad (I)$$

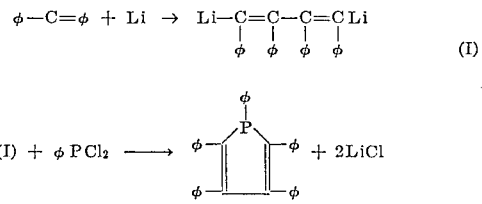

Example II.—A solution of 0.01 mole of 1,4-dilithium-1,2,3,4 tetraphenyl butadiene in 4 milliliter anhydrous diethyl ether was placed in a flask equipped with a magnetic stirrer and an inert atmosphere of dry nitrogen. An additional funnel containing 0.005 mole of stannic chloride as the etherate was attached. The stannic chloride etherate was leached into the reaction flask with 50 milliliters of diethyl ether at room temperature. After stirring for four hours, the ether was evaporated off. The products were taken up in methylene chloride. The inorganic salts filtered off and the organo-metallic heterocyclic compounds crystallized by addition of methanol. The organo-metallic spiro compound, thus prepared, was in the form of yellow crystals, melting point 281° C. Its structural formula is:

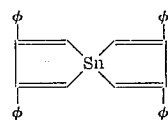

Example III.—Following the procedure in Example I, appropriate amounts of diphenyl acetylene and lithium are reacted in diethyl ether to form the lithium compound. This is then reacted, as in Example I, with dichlorodiphenolstibine to produce the pentaphenylstibole compound.

Example IV.—Following the procedure of Example II, 1–4 lithium tetraphenyl butadiene is reacted in anhydrous ether with phenylarsenicdichloride to produce the pentaphenyl arsenole compound.

Example V.—Following the procedure of Example II, a solution of 1–4 dilithium tetraphenyl butadiene was reacted with diphenyl silicon dichloride to produce the corresponding hexaphenyl silicole.

Example VI.—Following the same procedure, the dilithium tetraphenylbutadiene is reacted in ether solution with diphenyl germanium dichloride to produce the hexaphenyl germanole.

Typical compounds prepared in accordance with the invention are the following:

TABLE

| Dihalide Reactant | Product Formula | Appearance | M.P. ° C. |
|---|---|---|---|
| $(CH_3)_2SnCl_2$ | 1,1 dimethyl-2,3,4,5-tetraphenyl stannole | Colorless needles | 192–3 |
| $\phi PCl_2$ | Pentaphenyl phosphole | Yellow needles | 261–2 |
| $\phi AsCl_2$ | Pentaphenyl arsenole | ......do............ | 215–6 |
| $\phi SbCl_2$ | Pentaphenyl stibole | ......do............ | 160 |
| $SnCl_4$ | Octaphenyl-1,1'-spirobistannole | ......do............ | 281 |

Accordingly, from the preceding examples, it will be seen that compounds made in accordance with the process outlined conform to the general formula of the series of compounds defined. In summary, the properties of the compounds are that they are solids having relatively high melting points. They are usually soluble in aromatic solvents, such as benzene, toluene, xylene. Because of the content of the metal and other aspects of the structure, the compounds have rather wide utility in practically all applications wherein organo metallic compounds can be used. Accordingly, insecticide, catalysts for formation of polymers, stabilizers for the decomposition of polymers, heavy metal components for incorporation into polymers are indicated. They are also useful as anti-knock agents in internal combustion engine fuels and serve to provide the metal in useful soluble form as a component in a fluid catalyst system particularly.

What is claimed is:

1. A compound corresponding to the following formula:

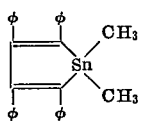

2. A compound corresponding to the following formula:

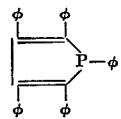

3. A compound corresponding to the following formula:

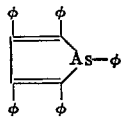

4. A compound corresponding to the following formula:

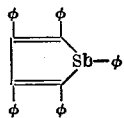

5. A compound having a formula given by the following:

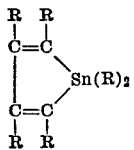

wherein R may be the same and is a chemical moiety independently selected from the group consisting of vinyl, aryl, alkyl, halogen, alkoxy, carboxyl, nitrile.

6. A compound having a formula given by the following:

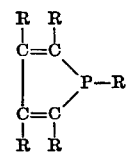

wherein R may be the same and is a chemical moiety independently selected from the group consisting of vinyl, aryl, alkyl, halogen, alkoxy, carboxyl, nitrile.

7. A compound having a formula given by the following:

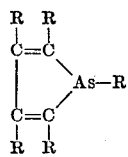

wherein R may be the same and is a chemical moiety independently selected from the group consisting of vinyl, aryl, alkyl, halogen, alkoxy, carboxyl, nitrile.

8. A compound having a formula given by the following:

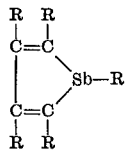

wherein R may be the same and is a chemical moiety independently selected from the group consisting of vinyl, aryl, alkyl, halogen, alkoxy, carboxyl, nitrile.

9. A compound having the formula:

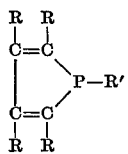

wherein R is aryl and R' is selected from the group consisting of alkyl, phenyl, and halogen.

10. A compound having the formula:

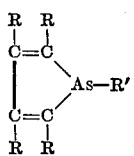

wherein R is aryl and R' is selected from the group consisting of alkyl, phenyl and halogen.

11. A compound having the formula:

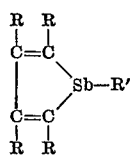

wherein R is aryl and R' is selected from the group consisting of alkyl, phenyl and halogen.

References Cited

UNITED STATES PATENTS

| | | | |
|---|---|---|---|
| 2,160,915 | 6/1939 | Schreiber | 260—440 |
| 2,839,566 | 6/1958 | Letsinger | 260—448 |

OTHER REFERENCES

Patterson et al.: "The Ring Index," A.C.S. Monograph No. 84, Reinhold Publ. Corp., 1940 pp. 43, 44, 54 and 56 relied on.

Krause et al.: "Die Chemie der Metall-organischen Verbindungen," published by Verlag von Gebruder Borntraeger, 1937, pp. 364, 634, 635, 570, 567 and 565.

Gilman et al.: J.A.C.S., vol. 77, No. 23, Dec. 5, 1955, pp. 6380–6381.

Kuivila et al.: J.A.C.S., vol. 80, No. 13, July 5, 1958, pp. 3250–3253.

TOBIAS E. LEVOW, *Primary Examiner.*

W. F. W. BELLAMY, *Assistant Examiner.*